United States Patent
Yaoita et al.

(10) Patent No.: US 10,180,674 B2
(45) Date of Patent: Jan. 15, 2019

(54) CONTROLLER AND CONTROL SYSTEM

(71) Applicant: OMRON Corporation, Kyoto-shi, Kyoto (JP)

(72) Inventors: Koji Yaoita, Kyoto (JP); Yoshitaka Takeuchi, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 130 days.

(21) Appl. No.: 15/123,086

(22) PCT Filed: Jan. 15, 2015

(86) PCT No.: PCT/JP2015/050957
§ 371 (c)(1),
(2) Date: Sep. 1, 2016

(87) PCT Pub. No.: WO2015/136973
PCT Pub. Date: Sep. 17, 2015

(65) Prior Publication Data
US 2017/0068234 A1    Mar. 9, 2017

(30) Foreign Application Priority Data

Mar. 14, 2014  (JP) ................................ 2014-052799

(51) Int. Cl.
*G05B 19/042* (2006.01)
*G05B 19/05* (2006.01)

(52) U.S. Cl.
CPC ....... *G05B 19/056* (2013.01); *G05B 19/0426* (2013.01); *G05B 2219/13004* (2013.01); *G05B 2219/23398* (2013.01)

(58) Field of Classification Search
None
See application file for complete search history.

(56) References Cited

U.S. PATENT DOCUMENTS

| | | | |
|---|---|---|---|
| 7,168,075 B1* | 1/2007 | Barthel | G05B 19/0428 700/82 |
| 2007/0174518 A1* | 7/2007 | Chandhoke | G05B 19/054 710/62 |
| 2010/0174387 A1* | 7/2010 | Ono | G05B 19/05 700/23 |

(Continued)

FOREIGN PATENT DOCUMENTS

| | | |
|---|---|---|
| CN | 101446818 A | 6/2009 |
| CN | 102135906 A | 7/2011 |

(Continued)

OTHER PUBLICATIONS

The extended European search report dated Jun. 7, 2017 in the counterpart European patent application.

(Continued)

*Primary Examiner* — Isaac T Tecklu
(74) *Attorney, Agent, or Firm* — Metrolexis Law Group, PLLC

(57) ABSTRACT

A controller continues to operate in a stable manner after program modification. A controller repeatedly executes a task A and a task B in cycles. The controller includes a RAM and a task control program. The RAM stores a fixed time set longer than an actual execution time of the task A as an execution time for the task A. The task control program executes the tasks A and B, and executes the task A by using the fixed time.

11 Claims, 13 Drawing Sheets

(56) References Cited

U.S. PATENT DOCUMENTS

| | | | |
|---|---|---|---|
| 2011/0302444 A1* | 12/2011 | Tashima | G06F 9/4411 714/2 |
| 2012/0240132 A1* | 9/2012 | Kobayashi | G06F 9/4887 718/107 |
| 2012/0291036 A1* | 11/2012 | Taira | B25J 9/1656 718/102 |
| 2013/0297548 A1* | 11/2013 | Cescolini | G06F 17/30 706/46 |
| 2013/0310976 A1* | 11/2013 | Taira | B25J 9/1656 700/250 |
| 2014/0012402 A1* | 1/2014 | Nishiyama | G05B 19/05 700/86 |
| 2014/0058565 A1* | 2/2014 | Shimamura | G05B 19/056 700/275 |
| 2014/0165077 A1* | 6/2014 | Martinez Canedo | G06F 8/451 718/105 |

FOREIGN PATENT DOCUMENTS

| | | |
|---|---|---|
| CN | 102804086 A | 11/2012 |
| CN | 103348294 A | 10/2013 |
| CN | 103403628 A | 11/2013 |
| CN | 103403632 A | 11/2013 |
| JP | 2006-090356 A | 4/2006 |
| JP | 2012-194681 A | 10/2012 |
| WO | 2012/104900 A1 | 8/2012 |
| WO | 2013010159 A1 | 1/2013 |

OTHER PUBLICATIONS

The Chinese office action (CNOA) dated Jul. 31, 2018 in a counterpart Chinese patent application.
The Chinese office action dated Mar. 27, 2018 in a counterpart Chinese Patent application.

* cited by examiner

| Name | Priority | Execution cycle | Fixed time | Programs assigned to task |
|---|---|---|---|---|
| Task A | 1 | 1 ms | 550 μs | P1, P2, P3 |
| Task B | 2 | 2 ms | Not set | P4, P5 |

| Task | Processing | POU-Prg | POU-FB/FUN | Execution time (minimum) | Execution time (maximum) | Fixed time | Difference: Margin (setting: max) |
|---|---|---|---|---|---|---|---|
| Primary | | | | 420 μs | 450 μs | 550 μs | 100 μs |
| | OUT | | | 100 μs | 100 μs | - | - |
| | IN | | | 100 μs | 100 μs | - | - |
| | UPG | | | 220 μs | 250 μs | - | - |
| | | P1 | | 50 μs | 55 μs | - | - |
| | | | FB11 | 12 | 15 | 20 | 5 |
| | | | FB12 | 29 | 30 | - | - |
| | | | FUN_1 | 1 | 5 | - | - |
| | | P2 | | 120 μs | 130 μs | - | - |
| | | | FB13 | 20 | 80 | 100 | 20 |
| | | | FB14 | 10 | 20 | - | - |
| | | | FUN_2 | 10 | 10 | - | - |
| | | P3 | | 50 μs | 65 μs | - | - |
| | Non-execution time | | | 100 μs | 130 μs | - | - |

CONTROLLER AND CONTROL SYSTEM

FIELD

The present invention relates to a controller and a control system.

BACKGROUND

Programmable logic controllers (PLCs) known in the art may control industrial machines installed in factory production lines.

A PLC includes a central processing unit (CPU) for controlling the PLC, an input unit for receiving a signal from a sensor, and an output unit for outputting a control signal to a control target device such as an industrial machine. The CPU has memory for storing a user program. The user program can be edited with a tool device connected to the CPU.

The PLC repeatedly performs the processing including storing a signal input in the input unit into the memory of the CPU, executing a user program, writing the execution results (computational results) obtained from the user program into the memory and transmitting the results to the output unit, and performing peripheral processing, or transmitting and receiving data to and from the tool device. Through such processing, the PLC controls an industrial machine based on inputs from the sensor.

Programmable automation controllers (PACs) incorporating the sophisticated software capabilities of a personal computer and the reliability of a PLC have also been known (refer to, for example, Patent Literature 1).

A PAC described in Patent Literature 1 uses time-sharing to execute multiple tasks in parallel, with each task being executed in cycles preset for the task. In other words, the PAC performs processing in a multitasking manner. Execution of a user program is assigned to each task.

CITATION LIST

Patent Literature

Patent Literature 1: Japanese Unexamined Patent Application Publication No. 2012-194681

SUMMARY

Technical Problem

A program used in a PLC is typically modified (upgraded) when its faults are eliminated or the controller is upgraded. Such program modification increases the amount of program code, and thus increases the execution time for an execution unit (e.g., the execution time for a task) of the modified program.

For the PLC described above, the task to which the program is assigned will have a larger load, and the entire system will also have a larger load. This can change the timings of communications between the CPU and the input and output units, and also the operational timings of programs executed for other tasks, and may adversely affect the operation of the controller.

One or more aspects of the present invention are directed to a controller that continues to operate in a stable manner after program modification.

Solution to Problem

In response to the above issue, a plurality of aspects will now be described. These aspects can be freely combined as appropriate.

A controller according to one aspect of the present invention repeatedly executes two or more types of tasks in cycles. The controller includes a storage unit and a task control unit. The storage unit stores, as an execution time of at least one of the two or more types of tasks, a fixed time longer than an actual execution time of the at least one type of task. The task control unit executes the two or more types of tasks. The task control unit executes the at least one type of task by using the fixed time.

The task control unit in the controller executes the at least one type of task by using the fixed time. Thus, when the processing for the task is modified after the initial setting, the actual execution time of the task would not exceed the fixed time. The task whose processing has been modified does not affect the execution timing of the other task. As a result, the controller operates in a stable manner after the processing assigned to the task is modified.

The at least two types of tasks may have different execution cycles.

The controller executes one task after the other task is executed. The task having a fixed time ends at a predetermined timing and thus does not affect execution of the task to be executed subsequently.

The task control unit may store the actual execution time of the at least one type of task into the storage unit every time when the task control unit executes the at least one type of task.

The controller stores the actual execution time of a task into the storage unit as real-time information every time when the task is executed. The user may read the above information by using another device and obtain the information.

A control system according to another aspect of the present invention includes the controller according to the above aspect and a fixed time setting apparatus. The fixed time setting apparatus includes a receiving unit and a setting unit. The receiving unit receives a preset execution time longer than the actual execution time of the at least one type of task. The setting unit sets the received preset execution time as the fixed time in setting the task.

In this system, the setting unit in the fixed time setting apparatus sets the preset execution time received by the receiving unit as the fixed time in setting the task.

The fixed time setting apparatus further includes an obtaining unit and a display unit. The obtaining unit obtains, from the controller, the fixed time and the actual execution time of the at least one type of task that is being executed in the controller. The display unit displays the obtained fixed time and the obtained actual execution time of the at least one type of task.

In this system, the obtaining unit in the fixed time setting apparatus obtains the fixed time and the actual execution time of the task, and the display unit displays the obtained information. This allows the user to obtain the relationship between the fixed time and the actual execution time of the task in real time by using the fixed time setting apparatus.

A controller according to another aspect of the present invention repeatedly executes a task. The controller includes a storage unit and a task control unit. The storage unit stores, as an execution time of at least one type of processing assigned to the task, a fixed time longer than an actual execution time of the processing. The task control unit executes the task. The task control unit executes the at least one type of processing by using the fixed time.

The task control unit in the controller executes the at least one type of processing by using the fixed time in executing the task. As a result, when the processing is modified after the initial setting, the actual execution time of the processing would not exceed the fixed time. A task whose processing has been modified thus does not affect the execution timing of another task. As a result, the controller operates in a stable manner after the processing is modified.

The at least one type of processing may be performed by a program component.

The at least one type of processing may be one or both of input processing and output processing for external data.

The task control unit may store the actual execution time of the at least one type of processing into the storage unit every time when the task control unit executes the at least one type of processing.

The controller stores the actual execution time into the storage unit as real-time information every time when the processing is executed. The user may read the above information by using another device and obtain the information.

A control system according to another aspect of the present invention includes the controller according to the above aspect and a fixed time setting apparatus. The fixed time setting apparatus includes a receiving unit and a setting unit. The receiving unit receives a preset execution time longer than the actual execution time of the at least one type of processing. The setting unit sets the received preset execution time as the fixed time in setting the processing.

In this system, the setting unit in the fixed time setting apparatus sets the fixed time based on the preset execution time received by the receiving unit in setting the processing. This sets the fixed time for the task.

The fixed time setting apparatus further includes an obtaining unit and a display unit. The obtaining unit obtains, from the controller, the fixed time and the actual execution time of the at least one type of processing that is being executed in the controller. The display unit displays the obtained fixed time and the obtained actual execution time of the at least one type of processing.

In this system, the obtaining unit in the fixed time setting apparatus obtains the fixed time and the actual execution time of the task, and the display unit displays the obtained information. This allows the user to obtain the relationship between the fixed time and the actual execution time of the processing in real time by using the fixed time setting apparatus.

Advantageous Effects

The controller and the control system according to one or more embodiments of the present invention set a fixed time longer than an actual execution time as the execution time for a task or for processing assigned to the task, and thus stabilize the controller operation after the processing is modified.

BRIEF DESCRIPTION OF THE DRAWINGS

FIG. 15 is a table showing task setting data according to a third embodiment.

DETAILED DESCRIPTION

1. First Embodiment (1) Overall Configuration of Control System

Figure 1:
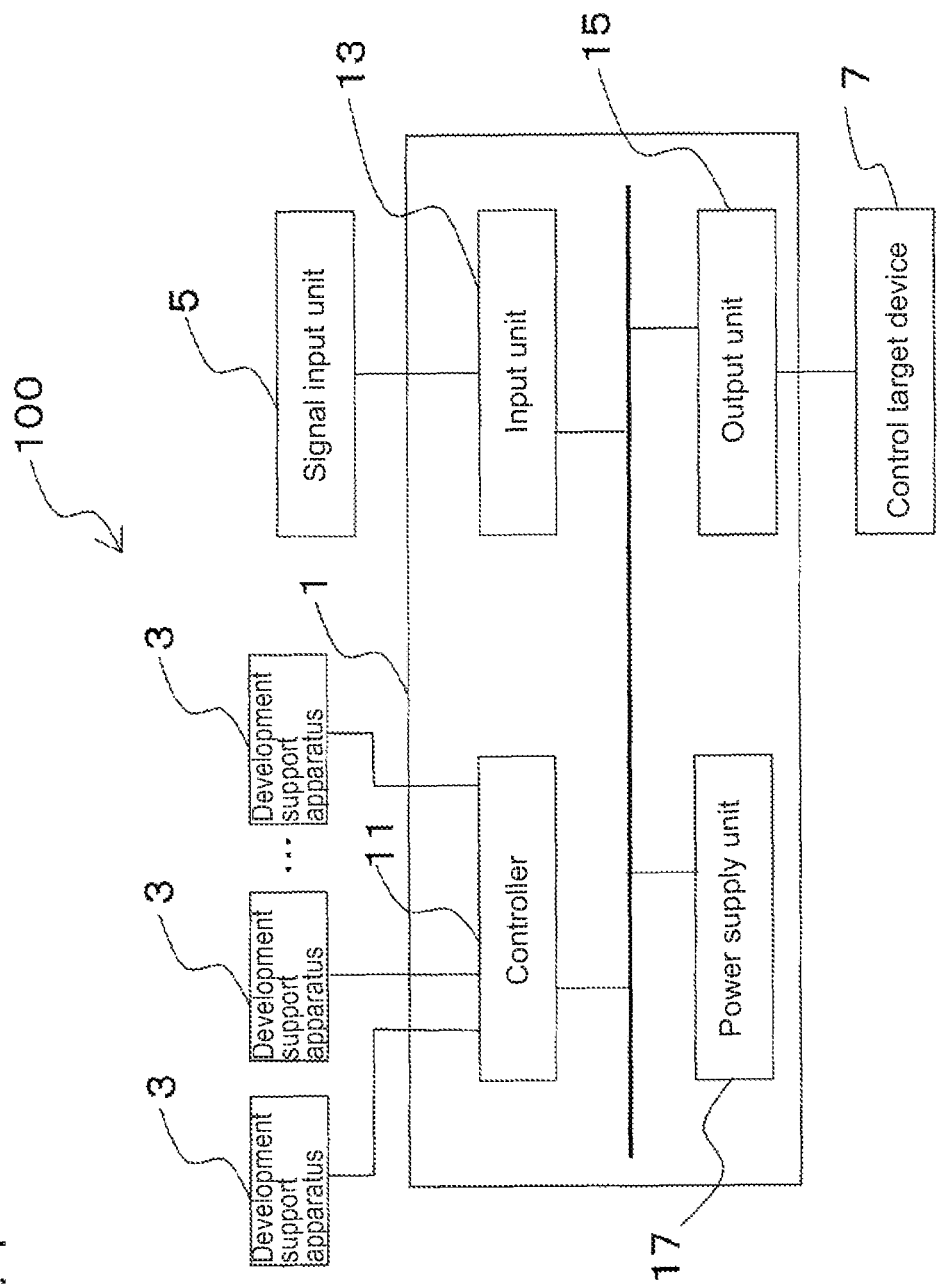
FIG. 1 is a block diagram showing the overall configuration of a control system.

The overall configuration of a control system according to a first embodiment will now be described with reference to FIG. 1. FIG. 1 is a block diagram showing the overall configuration of the control system. The control system 100 includes a programmable logic controller (PLC) system 1 and a development support apparatus 3.

The PLC system 1 receives a signal from a signal input unit 5, which is for example a sensor or a switch. The PLC system 1 executes a program using an input signal from the signal input unit 5 as appropriate to calculate an output signal for controlling a control target device 7.

The development support apparatus 3 has various capabilities for generating a user program (described later) to be executed in a controller 11. A single development support apparatus 3 is connectable to the PLC system 1, or any other number of development support apparatuses 3 permitted by the number of addresses assignable to such development support apparatuses 3 may be connected to the PLC system 1.

(2) PLC System Configuration

The configuration of the PLC system 1 will now be described in detail with reference to FIG. 1. The PLC system 1 includes the controller 11, an input unit 13, an output unit 15, and a power supply unit 17.

The controller 11 is a central processing unit (CPU) included in a programmable logic controller (PLC).

In the controller 11, a predetermined task is repeatedly executed in predetermined cycles. A task is an executable unit including a program organization unit (POU). An example of a task includes I/O refresh processing for updating an input variable based on an input signal from the input unit 13 and updating an output signal to the output unit 15 based on an output variable, and processing for executing a user program and/or a system program. A task may further include other processing such as motion control processing.

The input unit 13 receives an input signal from the signal input unit 5, such as a sensor or a switch, and outputs the input signal to the controller 11. The input unit 13 may be selected in accordance with the type of a signal input from the signal input unit 5. More specifically, when, for example, the signal input unit 5 is a thermocouple for measuring temperature, the input unit 13 may be an input unit for receiving an input signal indicating a voltage generated in the thermocouple. When, for example, the signal input unit 5 is an electrical switch, the input unit 13 may be an input unit for receiving an input signal indicating the on or off state of the switch.

The output unit 15 outputs an output signal to the corresponding control target device 7. This allows the controller 11 to control the control target device 7. The output unit 15 may be selected in accordance with the type of an output signal. When, for example, the control target device 7 is a motor for which positional control is to be performed, an output unit with a motion controller function may be used. When, for example, the control target device 7 is an electric furnace, an output unit may output a signal for controlling a relay that controls the electric furnace (e.g., a signal for controlling the on/off duty ratio).

The power supply unit 17 supplies power to the controller 11, the input unit 13, and the output unit 15.

The PLC system 1 may have all these components accommodated in a single housing, or may have the components individually accommodated in separate housings and connected to one another. In particular, the PLC system 1 including the input unit 13 and the output unit 15 as separate components allows intended numbers of intended control target devices and signal input units to be connected to the system.

(3) Configuration of Controller

Figure 2:
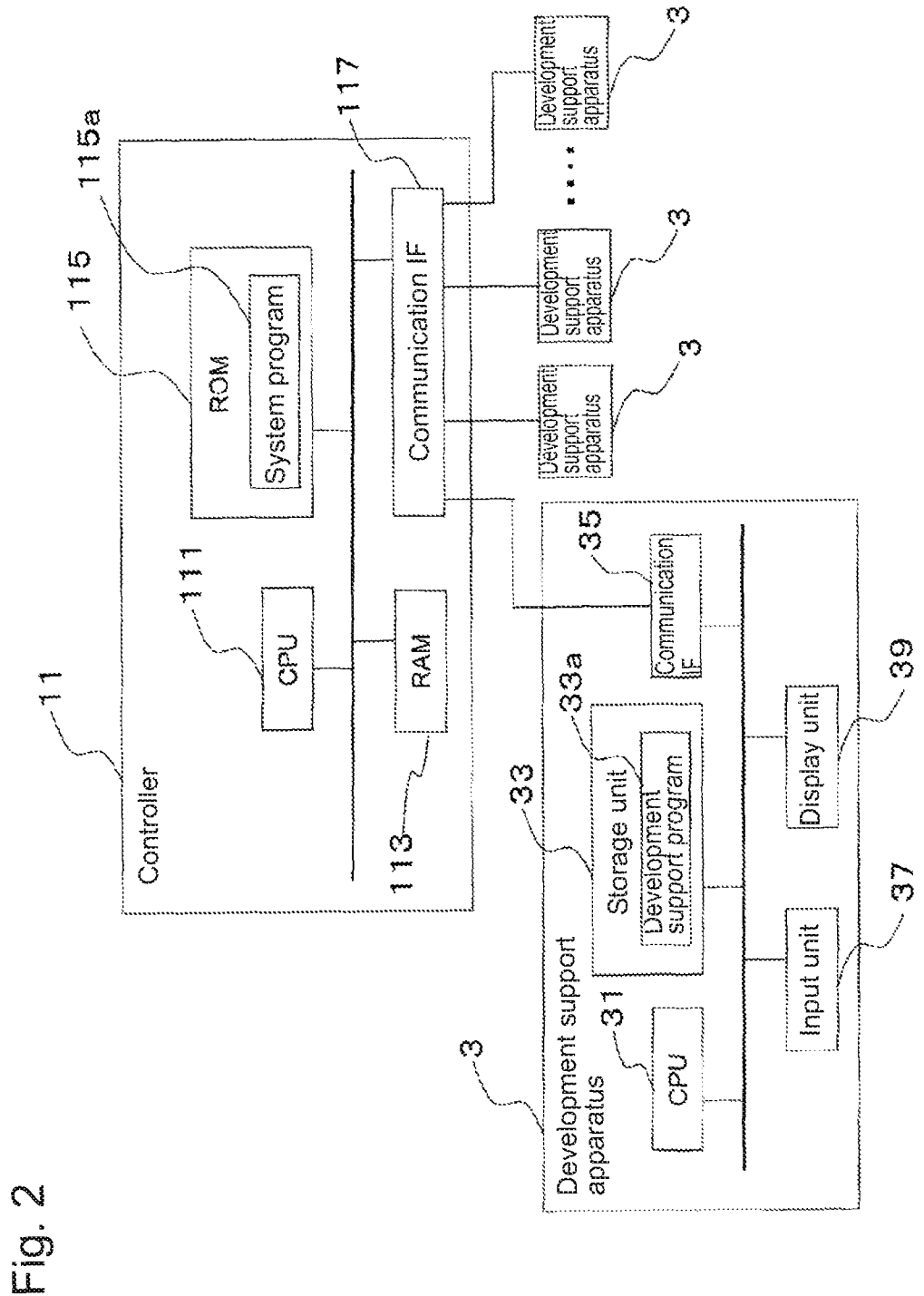
FIG. 2 is a block diagram showing the configuration of a controller and a development support apparatus.
Figure 3:
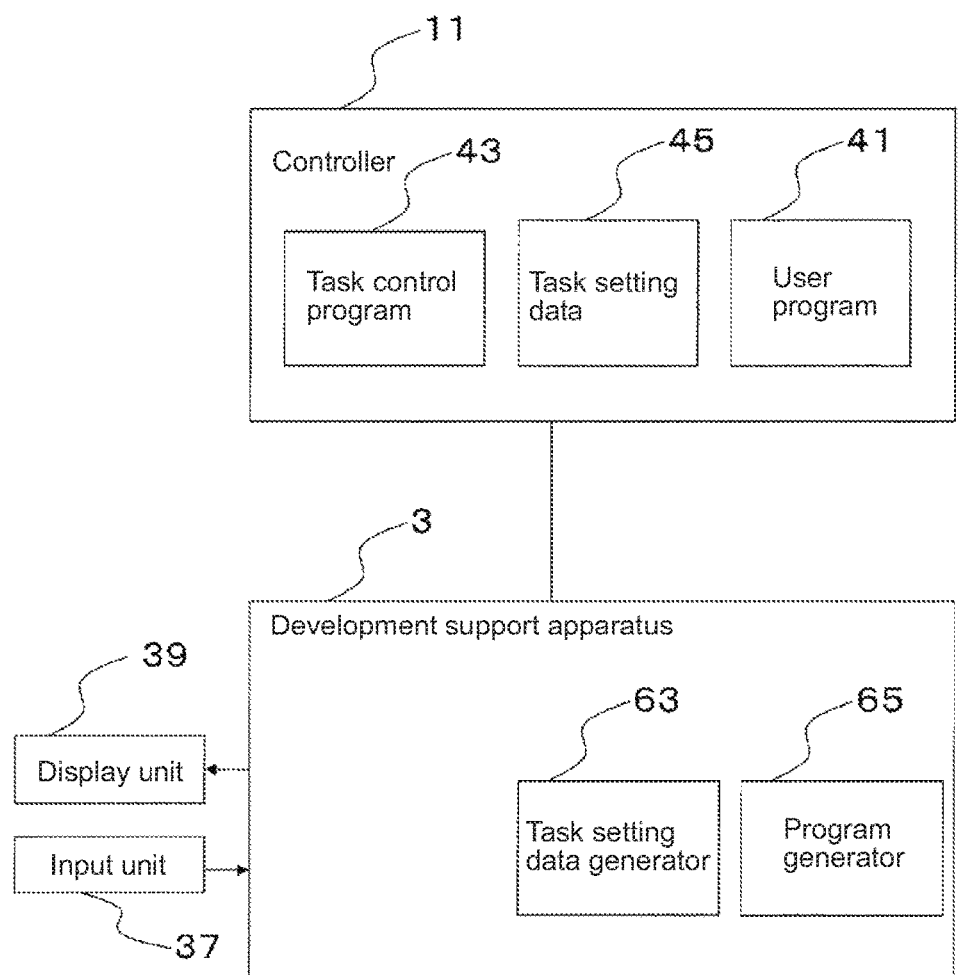
FIG. 3 is a block diagram showing the functions and data arrangements of the controller and the development support apparatus.

The configuration of the controller 11 will now be described in detail with reference to FIGS. 2 and 3. FIG. 2 is a block diagram showing the configuration of the controller and the development support apparatus. FIG. 3 is a block diagram showing the functions and data arrangements of the controller and the development support apparatus.

As shown in FIG. 2, the controller 11 includes a CPU 111, a RAM 113, a ROM 115, and a communication interface 117. The communication interface 117, which is connected to the development support apparatus 3, is used by the controller 11 to communicate with the development support apparatus 3.

The controller 11 includes a system program 115a installed in the ROM 115. The CPU 111 executes the system program 115a to control the operation of the controller 11. The system program 115a includes a program for storing a signal input to the input unit 13 into the RAM 113 and a program for providing computational results obtained by the CPU 111 and stored in the RAM 113 to the output unit 15.

As shown in FIG. 3, the RAM 113 stores a user program 41. The user program 41 includes multiple POUs.

A POU is a unit of an execution model for a user program conforming to IEC 61131-3. POUs include programs, functions, and function blocks. The functions and the function blocks are reusable. More specifically, a function and a function block can be shared by multiple user programs. A function returns a fixed output value corresponding to a predetermined input value upon receipt of the predetermined input value. A function block, which has an internal state, returns a variable output value corresponding to an input value.

As shown in FIG. 3, the RAM 113 stores a task control program 43. The task control program 43 controls task execution based on task setting data 45. The task control program 43 can change the task setting data 45 described below.

As shown in FIG. 3, the RAM 113 also stores the task setting data 45 for designating a task to be executed in the controller 11.

Figure 4:
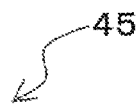
FIG. 4 is a table showing task setting data.

The task setting data 45 will now be described with reference to FIG. 4. FIG. 4 is a table showing the task setting data. The task setting data 45 includes task names, priorities, execution cycles, fixed execution times (described later), and the names of programs assigned to each task.

In one example, a task with the smaller number indicating its priority is executed with a higher priority. The controller 11 uses the control cycle of a preset time interval (e.g., 1 ms) as the common cycle used for the entire processing.

In the example shown in FIG. 4, a task A is executed with a higher priority than a task B, and is executed in a cycle of 1 ms. In other words, the task A has a single control cycle (a time interval of 1 ms) as its execution cycle. The task A has programs P1, P2, and P3 as POUs assigned to the task. The task A also includes a function block FB1, which is used in the program P1.

The task B is executed in a cycle of 2 ms. In other words, the task B has two control cycles (a time interval of 2 ms) as its execution cycle. The cycle of the task B is an integral multiple (twice) of the cycle of the task A. The task B has programs P4 and P5 as POUs assigned to the task. The task B also includes a function block FB2, which is used in the program P4.

The controller 11 can update a user program. More specifically, the controller 11 can perform online editing. The online editing is to modify or make addition to the user program 41 by operating the development support apparatus 3 without suspending the operation (task execution) of the controller 11.

During online editing, the controller 11 first receives a user program 41 uploaded from the development support apparatus 3 via the communication interface 117. The controller 11 then updates the user program 41 during a period after multiple running tasks are completed until the multiple tasks are restarted. For example, the controller 11 receives a POU (e.g., a function block) included in a user program via the communication interface 117, and then replaces an existing POU in a user program with the received POU.

(4) Configuration of Development Support Apparatus

The configuration of the development support apparatus 3 will now be described in detail with reference to FIGS. 2 and 3.

As shown in FIG. 2, the development support apparatus 3 includes a CPU 31, a storage unit 33, a communication interface 35, an input unit 37, and a display unit 39. The storage unit 33 stores a development support program 33a. The functions of the development support apparatus 3 are implemented by the CPU 31 executing the development support program 33a. The input unit 37 is an input device such as a keyboard, a mouse, or a touch panel. The display unit 39 is a display device including a liquid crystal display (LCD) or an organic electroluminescence (EL) display.

The display unit 39 can display the details of an input and the details of processing. The input unit 37 can receive task setting data, and a user program as a source program.

The communication interface 35 allows a task control program, a task setting instruction, and a user program stored in the storage unit 33 included in the development support apparatus 3 to be downloaded into the controller 11.

The functions of the development support program 3a for the development support apparatus 3 (FIG. 2) will be described with reference to FIG. 3. The development support program 3a includes a task setting data generator 63 and a program generator 65.

The task setting data generator 63 generates task setting data 45 based on task setting data input from the input unit 37.

The program generator 65 compiles a source program input from the input unit 37 to generate a user program 41.

When receiving a user program including a source program from the input unit 37, the program generator 65 compiles the received user program as the source program to generate a user program 41 for an object module.

When receiving task setting data from the input unit 37, the task setting data generator 63 uses the received task setting data to generate task setting data 45 that can be used by the PLC 1.

Subsequently, the development support apparatus 3 downloads the user program 41 and the task setting data 45 in the memory to the RAM 113 included in the controller 11.

Figure 5:
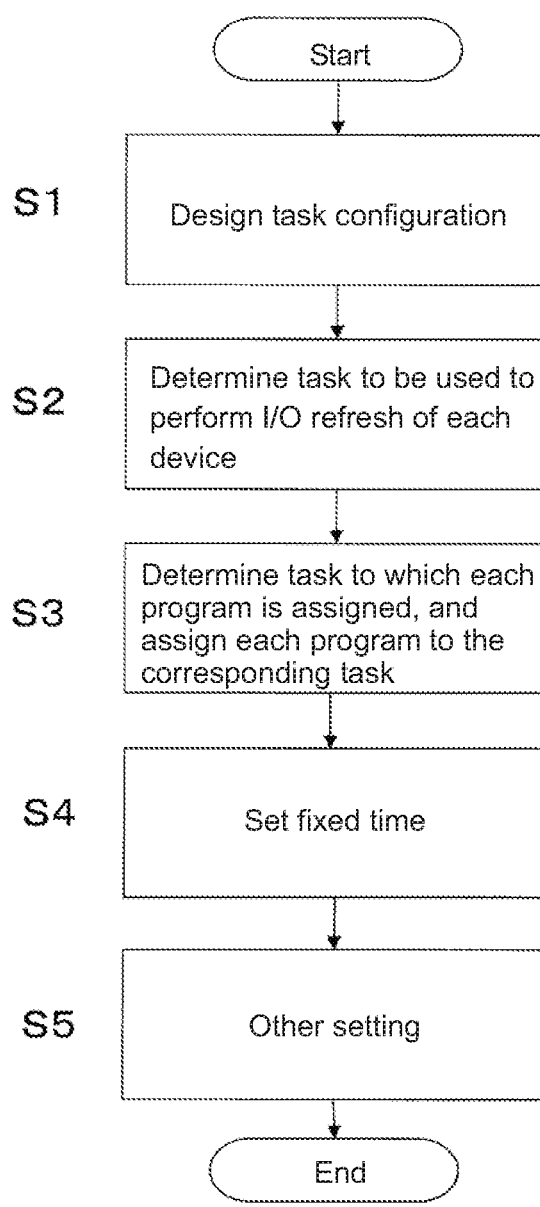
FIG. 5 is a flowchart showing task setting control.

Task setting performed in the development support apparatus 3, or generating the task setting data 45, will now be described with reference to FIG. 5. FIG. 5 is a flowchart showing task setting control. The control operation described below is mainly performed by the task setting data generator 63 based on an operation performed using the input unit 37.

First, the task configuration is designed based on intended input and output response performance of a control target device (step S1).

Subsequently, the target device(s) and one of the two tasks to perform I/O refresh of the device are determined (step S2).

The task to which each program is assigned is determined, and each program is assigned to the corresponding task (step S3).

A fixed time is set for each task (step S4). The fixed time set for each task as the task execution time is a period of time longer than an actual execution time taken for the task. In other words, the fixed time includes a non-execution time left after the task is executed. The non-execution time corresponds to a difference between the fixed time and the actual execution time. The fixed time may be longer than a maximum value of a predicted actual execution time. The user can easily set the fixed time for a task using the task setting data 45 in FIG. 4 appearing on the display unit 39. More specifically, the user inputs the fixed time for a task with the development support apparatus 3 through the input unit 37. The task setting data generator 63 updates the task setting data 45 using the fixed time for the task stored in the storage unit 33. In this manner, the task setting data generator 63 sets a fixed time for a task. A fixed time for a task is basically constant, unless it is changed as described later.

As described above, the input unit 37 and the storage unit 33 in the development support apparatus 3 function as a receiving unit for receiving a preset execution time longer than the actual task execution time. The task setting data generator 63 functions as a setting unit for setting the received preset execution time as the fixed time in the task setting. As described later, the task setting data generator 63 can also change the fixed time for the task during execution of the user program 41 by the controller 11.

Finally, the other setting is performed (step S5).

The fixed time will now be described further with reference to FIG. 4. In this embodiment, the fixed time is set for the task A, and is not for the task B. The fixed time for the task A is specifically 550 μs. The fixed time may be longer than the actual execution time of the programs for the task A.

(5) Control Operation

Figure 6:
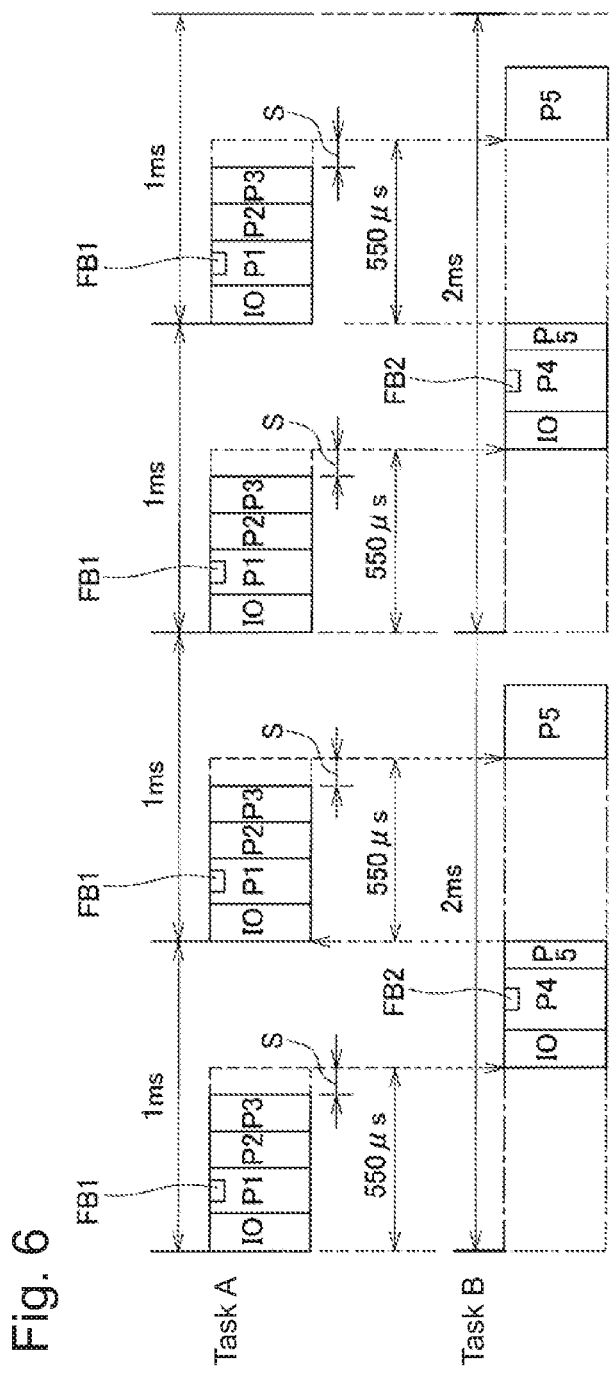
FIG. 6 is a timing chart showing task execution timings.

A task execution operation will now be described with reference to FIG. 6. FIG. 6 is a timing chart showing task execution timings.

When powered on, the controller 11 performs predetermined initial processing.

The execution cycles of the tasks A and B start simultaneously with the control cycle. The task A is executed in a cycle of 1 ms, and the task B is executed in a cycle of 2 ms. In this manner, the present embodiment uses two types of tasks with different execution cycles. Any other number of types of tasks may be used.

In this embodiment, the task A has the fixed time set as its execution time. The task A is thus executed with the fixed time. The task B has no fixed time set as its execution time.

The task control program 43 uses the task setting data 45 stored in the RAM 113 when executing the task A and the task B.

More specifically, the processing for the task A with the highest priority is started first. The task B, which has a lower priority than the task A, enters a standby state without its actual processing being started.

The programs P1, P2, and P3 assigned to the task A are executed. When the processing for the task A ends, the processing for the task B is started. More specifically, the programs P4 and P5 assigned to the task B are executed.

When a period of 1 ms passes from when the execution cycles of the tasks A and B are started simultaneously, the execution cycle of the task A passes. Thus, the execution of the program P5 assigned to the task B is suspended, and the execution of the task A is started. The task B is in a standby state.

When the programs P1, P2, and P3 assigned to the task A are executed and the processing for the task A ends, the execution of the program P5, which has been suspended in the task B, is resumed. The remaining part of the program P5 is thus executed.

When periods of 2 ms and 3 ms pass from when the execution cycles of the tasks A and B are started simultaneously, the execution cycle of the task A passes, and the execution of the task A is started.

When a period of 2 ms passes after the execution cycles of the tasks A and B are started simultaneously, the execution cycle of the task A passes. Thus, the execution of the task A is started. The execution cycle of the task B also passes, and the task B is in a standby state. More specifically, when a period of 2 ms passes from the simultaneous start of the execution cycles of the tasks A and B, the execution cycles of the tasks A and B are started simultaneously again. The above operation is hereafter performed repeatedly.

When executing the task A, the task control program 43 uses the fixed time written in the task setting data 45 as the execution time. As shown in FIG. 6, the fixed time for the task A is set longer than the actual execution time of the programs assigned to the task A (the execution time of the real code). Thus, the non-execution time S is left between the end of actual processing and the start of execution of the programs assigned to the task B. The non-execution time S is left to accommodate changes including future modifications and extensions. In the example shown in FIG. 6, the fixed time for the task A is 550 µs, whereas the actual execution time of the task A is 500 µs, and thus the non-execution time S is 50 µs. No processing may be performed during the non-execution time S. For example, a null loop may be processed or program execution may be suspended during the non-execution time S. The processing that does not affect the execution order of tasks and programs, or for example external communications or events, may be performed during the non-execution time S.

This controller has the fixed time set for the task A. When the execution time of the processing assigned to the task A is modified to be longer, the actual execution time would not exceed the fixed time. In other words, a change in the processing for the task A does not affect the execution of the task B. More specifically, a longer actual execution time taken for the task A would not change the start timing of the task B, and the task B can be executed correctly as preset.

Figure 7:
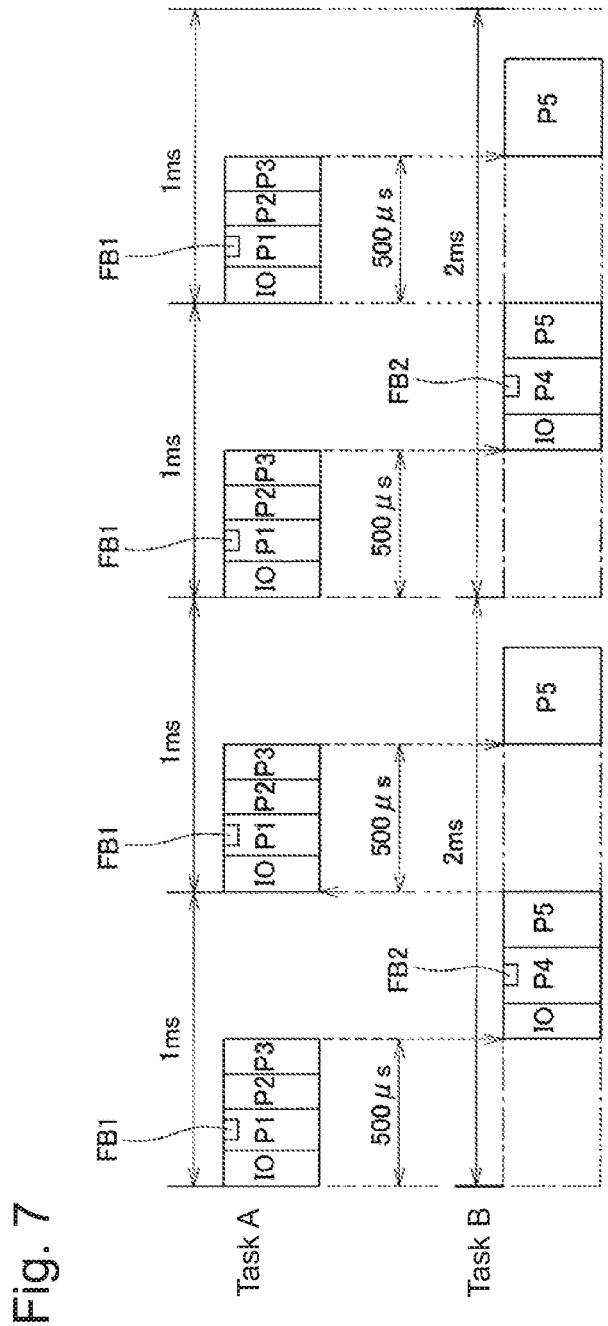
FIG. 7 is a timing chart showing task execution timings different from an embodiment of the present invention.
Figure 8:
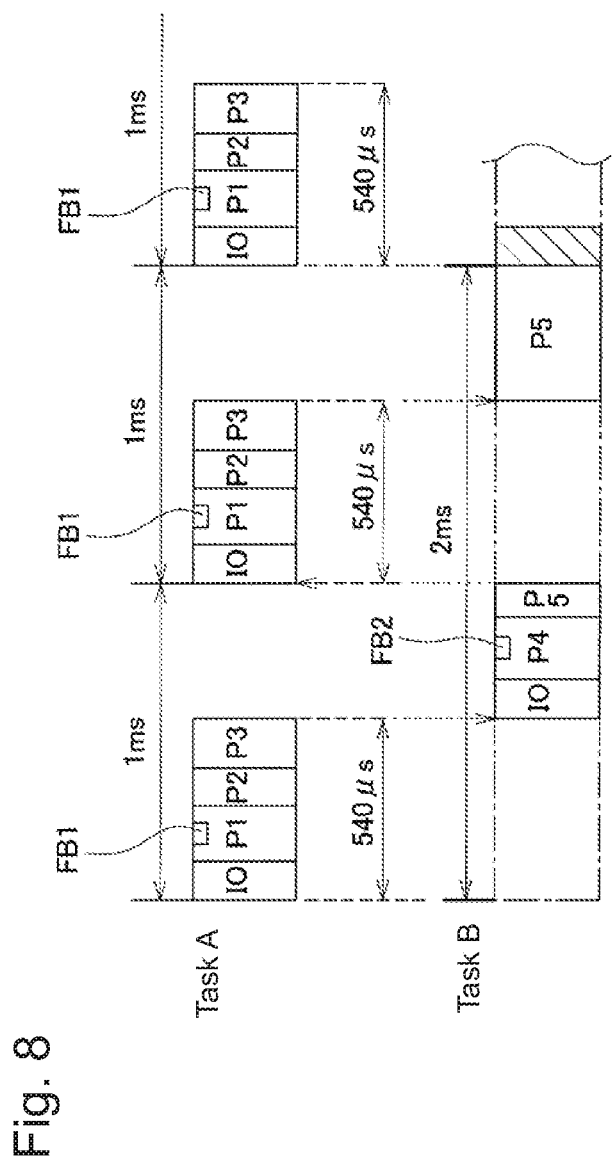
FIG. 8 is a timing chart showing task execution timings different from the embodiment of the present invention.

Difficulties that can occur in an example different from the embodiment of the present invention will now be described with reference to FIGS. 7 and 8. FIGS. 7 and 8 are timing charts showing task execution timings different from the embodiment of the present invention.

In this example, no fixed time is set for the task A, unlike in the embodiment of the present invention. Although the actual execution time of the task A is 500 µs in FIG. 7, a change in the assigned POUs may extend the execution time. For example, the execution time of the task A can change from the state shown in FIG. 7 to a longer time shown in FIG. 8 (e.g., the actual execution time of the changed task A is 540 µs). This can delay the start of the execution of the task B. In this case, the start timing of the task B is delayed, and thus the end timing of the task B is delayed. As a result, the task B, which falls within the cycle of 2 ms in FIG. 7, exceeds the cycle of 2 ms in FIG. 8 (hatched area). This disables execution of the program P5 assigned to the task B.

Figure 9:
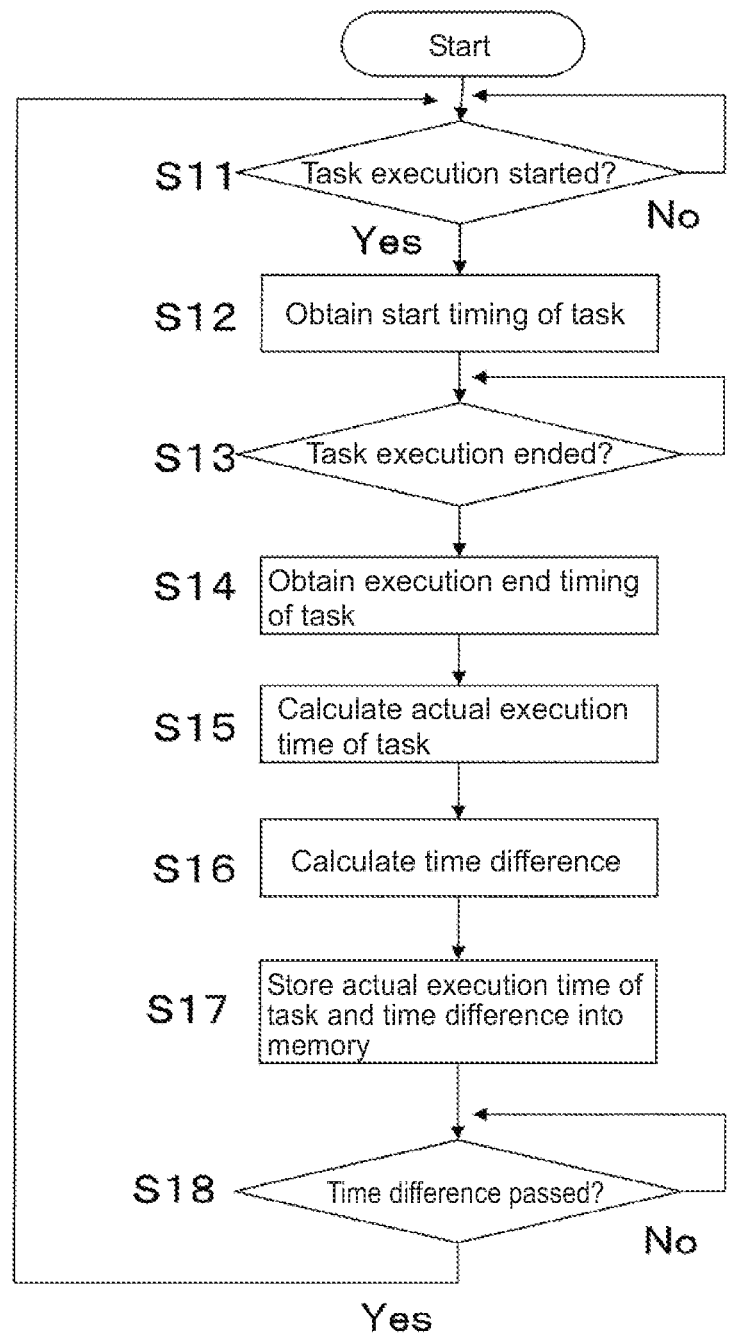
FIG. 9 is a flowchart showing control for obtaining an actual task execution time.

Returning to the embodiment of the present invention, the control for obtaining and displaying the actual execution time of the task A will now be described with reference to FIG. 9. FIG. 9 is a flowchart showing the control for obtaining the actual task execution time. The control operation described below is mainly performed by the task control program 43.

First, starting the task execution is waited (step S11).

When the task execution is started (Yes in step S11), the task control program 43 obtains the start timing of the task A from a timer (not shown) (step S12).

The task control program 43 waits until the execution of the task A ends (step S13).

When the task execution ends, the task control program 43 obtains the execution end timing of the task A from the timer (not shown) (step S14).

The task control program 43 then calculates the actual execution time of the task A (step S15).

The task control program 43 calculates a difference between the fixed time and the actual execution time (step S16).

The task control program 43 stores the actual execution time of the task A and the calculated difference into the RAM 113 (step S17). The task control program 43 may store only the actual execution time of the task A into the RAM 113. In this manner, the actual execution time is stored into the RAM 113 as real-time information every time when the task A is executed.

When the time corresponding to the difference passes and ends the fixed time (Yes in step S17), the task control program 43 finally returns the processing to step S11.

The development support apparatus 3 obtains the actual execution time of the task A, the fixed time, and the difference from the controller 11 regularly or in response to an instruction from the user. More specifically, the task setting data generator 63 requests the actual task execution time, the fixed time, and the difference stored in the RAM 113 from the controller 11, and receives the actual task execution time, the fixed time, and the difference transmitted from the controller 11. The task setting data generator 63 stores the above data into the storage unit 33.

Figure 10:
FIG. 10 is a table showing the relationship between an actual task execution time and a fixed time.

This allows the display unit 39 included in the development support apparatus 3 to display a table 52 shown in FIG. 10. FIG. 10 is a table showing the relationship between the actual execution time of the task A and the fixed time. FIG. 10 shows the minimum execution time, the maximum execution time, the fixed time, and the difference. The difference is between the fixed time and the maximum execution time. This table allows the user to obtain the relationship between the actual execution time of the task A and the fixed time in real time. The ratio of the maximum execution time to the fixed time may be displayed as the determination result for the relationship between the actual execution time of the task A and the fixed time. Either the difference or the ratio or both may be displayed. As described above, the task setting data generator 63 in the development support apparatus 3 functions as an obtaining unit for obtaining, from the controller 11, the fixed time and the actual execution time of the task A executed in the controller 11.

Although the difference between the fixed time and the actual execution time is calculated by the controller 11 in the above embodiment, the difference may be calculated by the development support apparatus 3.

The user views the table 52 in FIG. 10 appearing on the display unit 39 in the development support apparatus 3, and inputs an intended change into the development support apparatus 3 through the input unit 37. For example, the user compares the maximum execution time with the fixed time, and shortens the fixed time when determining that the difference is sufficiently large, or extends the fixed time when determining that the difference is insufficiently large.

As a result, the task setting data generator 63 in the development support apparatus 3 modifies the task setting data 45 and transmits information about the modification to the controller 11. In response to this, the task control program 43 in the controller 11 changes the task setting data 45. More specifically, the value of the fixed time for the task A in the task setting data 45 shown in FIG. 4 is changed. As described above, the task setting data generator 63 functions as a setting unit for changing the fixed time for the task during execution of the user program 41.

The changed fixed time is used for the task A, which starts after the value of the fixed time is changed.

As described above, the relationship between the actual task execution time and the fixed time (in particular, the difference or the ratio) is determined every time when the task control program 43 executes a task. The task setting data generator 63 in the development support apparatus 3 can set a fixed time again based on the determination result.

Although the fixed time is set only for the task A in the above embodiment, the fixed time may be set only for the task B or may be set for both the task A and the task B.

The above embodiment reduces the effect of reconfiguration in a flexible PLC to or from which input and output units can be added or removed.

2. Second Embodiment

Although the first embodiment sets the fixed time for a task, the present invention is not limited to that embodiment. The fixed time may be set for the execution time of various types of processing (e.g., programs or I/O refresh) assigned to a task.

Figure 11:
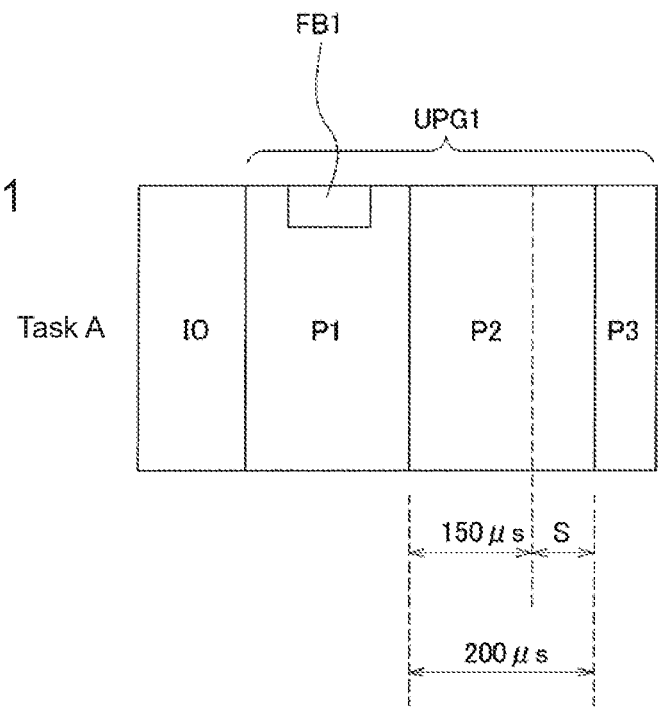
FIG. 11 is a timing chart for a task according to a second embodiment.

An embodiment of the present invention applied to a POU will now be described with reference to FIG. 11. FIG. 11 is a timing chart for a task according to a second embodiment. Although the system in the present embodiment has the same configuration as the control system 100 described in the first embodiment, the fixed time is not set for a task in the present embodiment, unlike in the first embodiment.

In FIG. 11, a user program UPG1 assigned to a task A includes a program P1, a program P2, and a program P3, which are POUs. The program P2 has an actual execution time of 150 μs, whereas its fixed time is set at 200 μs. In this case, a non-execution time S (50 μs in this example) is left between the end of actual processing of the program P2 and the start of execution of the program P3. When the program P2 is changed, the actual execution time would not exceed the fixed time. This prevents the execution time of the task A from increasing and affecting the execution of the task B.

In this embodiment, the processing for obtaining the actual execution time of the POU, determining the relationship between the actual time of the POU and the fixed time, and displaying the actual time of the POU and the fixed time is performed in the same manner as described in the first embodiment.

This controller has the fixed time set for the program P2, which is assigned to the task A. When the execution time of the program P2 is modified to be longer, the actual execution time would not exceed the fixed time. In other words, a change in the program P2 does not affect the execution time of the task A. As a result, a change in the processing for the task A does not affect the execution of the task B as in the first embodiment. More specifically, a longer actual execution time taken for the task A would not change the start timing of the task B, and thus the task B can be executed as preset.

Although the fixed time is set for only the program P2 in this embodiment, the fixed time may also be set for the program P1 and the program P3.

Figure 12:
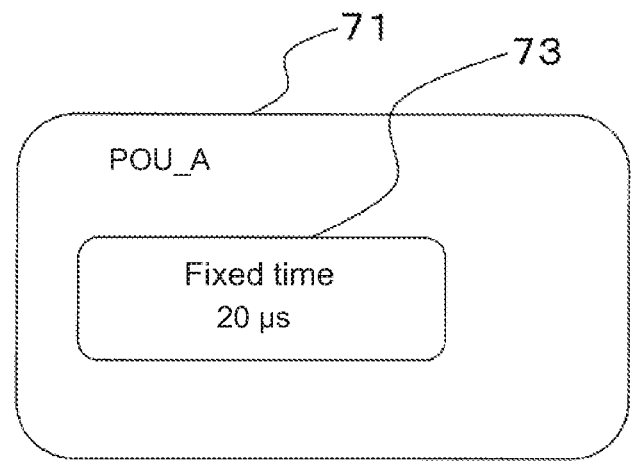
FIG. 12 is a diagram showing the structure of a POU.

Setting the fixed time for a POU will now be described with reference to FIG. 12. FIG. 12 is a diagram showing the structure of a POU. A POU, or POU_A 71, includes fixed time information 73. In this example, the CPU 111 of the controller 11 reads the fixed time information 73 included in the POU_A 71, and executes this POU, or POU_A 71, based on the fixed time setting.

Figure 13:
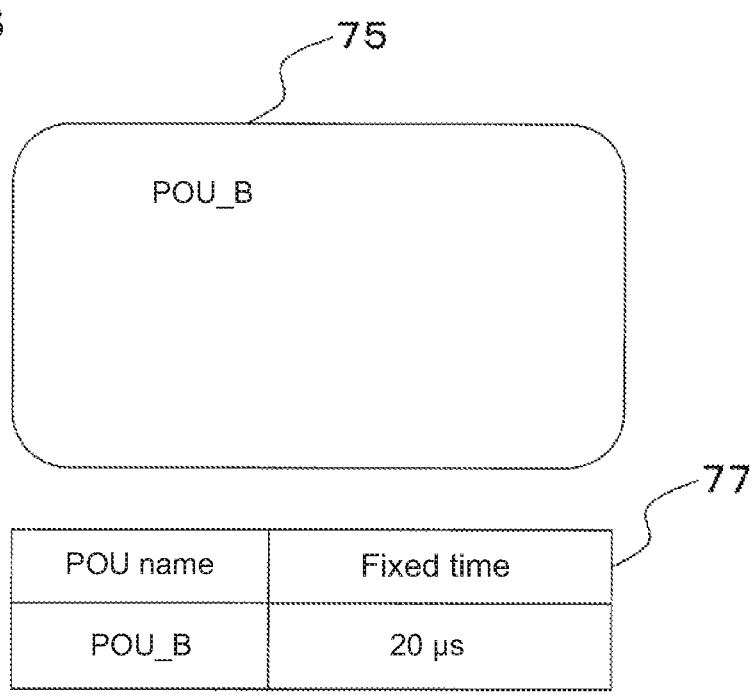
FIG. 13 is a diagram showing the structure of another POU.

A modification of the second embodiment will now be described with reference to FIG. 13. FIG. 13 is a diagram showing the structure of a POU. A POU_B 75 includes no fixed time information. Instead, the fixed time information for the POU_B 75 is written in a table 77. The CPU 111 of the controller 11 reads the fixed time information stored in the table 77, and executes this POU, or POU_A 71, based on the fixed time setting.

Setting the fixed time for function blocks, among other POUs, will now be described. A function block includes a definition and an instance. The instance is a variable, which has multiple attributes (e.g., a constant and an initial value). In this embodiment, the fixed time is set as an attribute of the variable to allow the user end of a library to change the fixed time setting in the definition. This example uses, for example, a variable table including the variable name, type, and fixed time setting. The CPU 111 of the controller 11 prioritizes the attributes of the instance over the setting in the definition to fix the execution time of the function block. In another example, the set value in the definition may be overwritten with the set value in the instance.

The fixed time setting for the above POU is executed when the program generator 65 in the development support apparatus 3 generates the user program 41. The online editing function (described above) of the development support apparatus 3 to rewrite the attributes of a variable allows the fixed time for a POU in the user program 41 to be changed during operation of the controller 11.

In online editing, the development support apparatus 3 uploads the user program 41 during normal operation to change the fixed time setting for a POU. The changed fixed time is used for subsequent execution of the POU.

Figure 14:
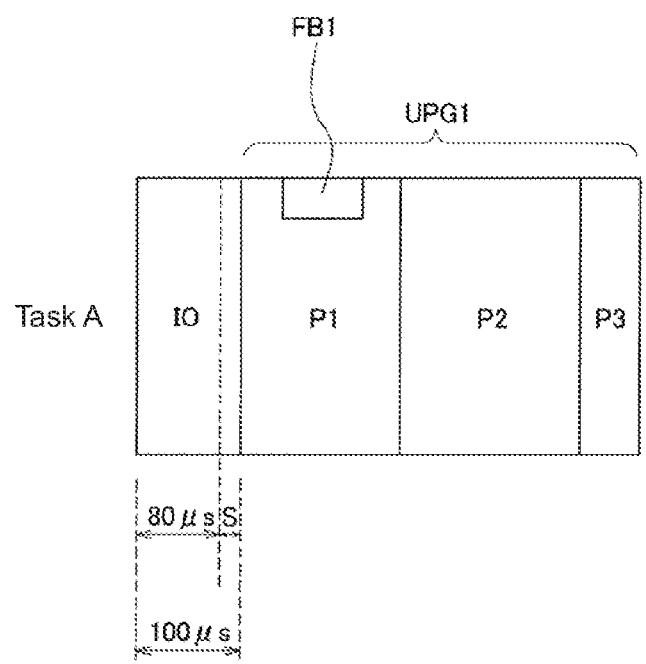
FIG. 14 is a timing chart for a task according to a modification of the second embodiment.

A modification of the present embodiment will now be described with reference to FIG. 14. FIG. 14 is a timing chart for a task according to the modification of the second embodiment.

In this modification, the fixed time is set for I/O refresh of a task A. In this case, the fixed time may be set for the entire I/O refresh, or for either the input data processing or the output data processing.

The fixed time setting for I/O refresh is performed under the same setting conditions and the same setting method as in the above embodiment, and produces the same setting effects as described in the above embodiment.

3. Third Embodiment

Although the fixed time is set for a task in the first embodiment and the fixed time is set for processing assigned to a task in the second embodiment, the fixed time may be set for both a task and processing assigned to the task.

A third embodiment will now be described with reference to FIG. 15. FIG. 15 is a table showing task setting data according to the third embodiment.

The system in the present embodiment has the same configuration as the control system 100 described in the first embodiment. The functions of the first embodiment (setting the fixed time for a task) and the functions of the second embodiment (setting the fixed time for processing assigned to a task) are both implemented by the controller 11 and the development support apparatus 3.

In this embodiment, a table 54 shown in FIG. 15 appears on the display of the display unit 39 in the development support apparatus 3. The table 54 includes the fixed time set for a primary task, and the fixed times further set for a function block FBI1 included in a program P1 and a function block FBI3 included in a program P2.

The user views the display unit 39 in the development support apparatus 3 to obtain the relationship between the fixed times and the maximum execution times that change depending on the actual operation. The user can also change the fixed time for the primary task, and the fixed times for the function block FBI1 of the program P1 and the function block FBI3 of the program P2 by operating the input unit 37 included in the development support apparatus 3. As described above, the fixed times can be changed during execution of the task, and thus the fixed time setting can be easily optimized.

4. Other Embodiments

Although the embodiments of the present invention have been described, the invention is not limited to the above embodiments. The embodiments may be variously modified without departing from the spirit and scope of the invention. In particular, the embodiments and modifications described herein may be combined freely as appropriate.

INDUSTRIAL APPLICABILITY

One or more embodiments of the present invention are widely applicable to controllers and control systems.

REFERENCE SIGNS LIST

1 PLC system
3 development support apparatus
5 signal input unit
7 control target device
11 controller
13 input unit
15 output unit
17 power supply unit
31 CPU
33 storage unit
33a development support program
35 communication interface
37 input unit
39 display unit
41 user program
43 task control program
45 task setting data
63 task setting data generator
65 program generator
71 POU_A
73 fixed time information
75 POU_B
79 fixed time information
100 control system
111 CPU
113 RAM
115 ROM
115a system program
117 communication interface

The invention claimed is:

1. A controller for repeatedly executing two or more types of tasks in cycles, the controller comprising a processor configured with a program to perform operations comprising:
   operation as a storage unit storing a fixed time having a length between a time taken to execute at least one of the two or more types of tasks and a length of a control cycle corresponding to the at least one of the two or more types of tasks; and
   operation as a task control unit configured to execute the two or more types of tasks, the task control unit being configured to execute the at least one of the two or more types of tasks within the fixed time, wherein
   execution of the at least one of the two or more types of tasks is immediately followed by a non-execution time having a length less than a difference between the control cycle corresponding to the at least one of the two or more types of tasks and the time taken to execute the at least one of the two or more types of tasks.

2. The controller according to claim 1, wherein
the length of the control cycle corresponding to the at least one of the two types of tasks is different from a length of a control cycle corresponding to another of the two types of tasks.

3. The controller according to claim 1, wherein
the task control unit is configured to store the time taken to execute the at least one of the two or more types of tasks into the storage unit every time the task control unit executes the at least one of the two or more types of tasks.

4. A control system, comprising:
the controller according to claim 1; and
a fixed time setting apparatus comprising a processor configured with a program to perform operations comprising:
   operation as a receiving unit configured to receive a preset fixed time having a length between the time taken to execute the at least one of the two or more types of tasks and the length of the control cycle corresponding to the at least one of the two or more types of tasks, and
   operation as a setting unit configured to set the received preset fixed time as the fixed time.

5. The control system according to claim 4, wherein
the processor of the fixed time setting apparatus is further configured with the program to perform operations comprising:
   operation as an obtaining unit configured to obtain, from the controller, the fixed time and the time taken to execute the at least one of the two or more types of tasks; and
   operation as a display unit configured to display the obtained fixed time and the obtained time taken to execute the at least one of the two or more types of tasks.

6. A controller for repeatedly executing a task, the controller comprising a processor configured with a program to perform operations comprising:
   operation as a storage unit storing a fixed time having a length between a time taken to execute at least one type of processing assigned to the task and a length of a control cycle corresponding to the at least one type of processing assigned to the task; and
   operation as a task control unit configured to execute the task, the task control unit being configured to execute the at least one type of processing assigned to the task within the fixed time, wherein
   execution of the at least one type of processing assigned to the task is immediately followed by a non-execution time having a length less than a difference between the control cycle corresponding to the at least one type of processing assigned to the task and the time taken to execute the at least one type of processing assigned to the task.

7. The controller according to claim 6, wherein
the at least one type of processing assigned to the task is performed by a program component.

8. The controller according to claim 6, wherein
the at least one type of processing assigned to the task comprises one or both of input processing and output processing for external data.

9. The controller according to claim 6, wherein
the task control unit is configured to store the time taken to execute the at least one type of processing assigned to the task into the storage unit every time the task control unit executes the at least one type of processing assigned to the task.

10. A control system, comprising:
the controller according to claim 6; and
a fixed time setting apparatus comprising a processor configured with a program to perform operations comprising:
operation as a receiving unit configured to receive a preset fixed time having a length between the time taken to execute the at least one type of processing assigned to the task and the length of the control cycle corresponding to the at least one type of processing assigned to the task, and
a setting unit configured to set the received preset fixed time as the fixed time.

11. The control system according to claim 10, wherein
the processor of the fixed time setting apparatus is further configured with the program to perform operations comprising:
   operation as an obtaining unit configured to obtain, from the controller, the fixed time and the time taken to execute the at least one type of processing assigned to the task; and
   operation as a display unit configured to display the obtained fixed time and the obtained time taken to execute the at least one type of processing assigned to the task.

* * * * *